United States Patent
Radusewicz et al.

(10) Patent No.: US 6,853,530 B1
(45) Date of Patent: *Feb. 8, 2005

(54) APPARATUS AND METHOD FOR ACTUATING A MECHANICAL DEVICE

(75) Inventors: Peter Radusewicz, Lockport, IL (US); Kenneth C. Krchak, Crystal Lake, IL (US); Ronald L. Schultz, Northfield, IL (US)

(73) Assignee: General Electric Company, Schenectady, NY (US)

( * ) Notice: Subject to any disclaimer, the term of this patent is extended or adjusted under 35 U.S.C. 154(b) by 344 days.

This patent is subject to a terminal disclaimer.

(21) Appl. No.: 09/662,932

(22) Filed: Sep. 15, 2000

(51) Int. Cl.[7] .............................................. H01H 47/00
(52) U.S. Cl. ..................................... 361/152; 361/160
(58) Field of Search .............................. 361/152, 160, 361/144, 115, 62, 64, 66

(56) References Cited

U.S. PATENT DOCUMENTS

| | | | |
|---|---|---|---|
| 4,228,415 A | | 10/1980 | Schantz |
| 4,308,891 A | | 1/1982 | Loup |
| 4,630,165 A | * | 12/1986 | D'Onofrio .................. 361/154 |
| 4,631,629 A | * | 12/1986 | Mallick, Jr. ................. 361/154 |
| 4,812,945 A | | 3/1989 | D'Onofrio |
| 4,894,631 A | | 1/1990 | Castonguay et al. |
| 5,135,027 A | | 8/1992 | Miki et al. |
| 5,197,507 A | | 3/1993 | Miki et al. |
| 5,423,117 A | | 6/1995 | Okada et al. |
| 5,782,267 A | | 7/1998 | Yoo |
| 5,886,607 A | | 3/1999 | Ricker |
| 5,903,206 A | | 5/1999 | Koga et al. |
| 6,041,816 A | | 3/2000 | Hiramatsu et al. |
| 6,098,903 A | * | 8/2000 | Touvelle et al. ......... 239/585.1 |

FOREIGN PATENT DOCUMENTS

WO          WO0045403          8/2000

OTHER PUBLICATIONS

European Search Report, dated Jun. 19, 2002, Application No. EP 01307859.7, for General Electric Company.

* cited by examiner

*Primary Examiner*—Stephen W. Jackson
(74) *Attorney, Agent, or Firm*—Armstrong Teasdale LLP (57) ABSTRACT

An integrated module encased in protective housing is electrically and mechanically connected to a solenoid, which remotely actuates an Automatic Transfer Switch (ATS) or lighting contactor. The module includes a full-wave bridge rectifier, voltage transient voltage protection-circuitry, a proximity detector to determine the solenoid's plunger position, and a mounting strap to attach the solenoid to a frame. In addition, the module accepts various resistor values as plug-in devices to reduce a line voltage and incorporates a communication device/modem for connection to the Internet. The module allows a fixed voltage across the solenoid coil, and permits the solenoid to be connected to various operating voltages.

69 Claims, 4 Drawing Sheets

APPARATUS AND METHOD FOR ACTUATING A MECHANICAL DEVICE

BACKGROUND OF THE INVENTION

This invention relates generally to actuators, and more particularly to a solenoid assembly that remotely actuates a mechanical device.

A solenoid is an electromagnet including a coil wrapped around a plunger. A solenoid converts electrical energy into mechanical energy. A magnetic field is generated by the flow of current through the coil. When current flows through the coil, a magnetic field is generated that moves a plunger inserted in the coil. Magnetism produced by the coil draws the plunger into the coil. Alternating current has positive and negative peak amplitudes. When alternating current is applied to a solenoid, the magnetic field produced is strongest at the positive and negative peaks of the sinusoidal signal. Solenoid force increases with an increase in coil current because as current increases, magnetism builds in the solenoid coil. When magnetism builds up in the coil, the plunger is moved within the coil.

Known solenoids include accessory packages which incorporate mechanical switches. These accessory packages are used for holding the solenoid in an actuated condition at reduced power consumption. In certain known configurations, the winding is tapped to provide a coil of reduced force and connected via a switch actuated by the plunger. Other known configurations include a solenoid mechanically strapped to a device electrically connected via long leads to a separate rectifier.

Solenoids are used in a wide variety of electrical applications requiring linear movement. Typical electrical applications range from household appliances, including washing machines and dishwashers, to automobiles and doorbell chimes. One known use of solenoids has been to operate Automatic Transfer Switches (ATS), which are primarily used in backup power systems. ATSs transfer an electrical load connected to one power source, e.g., a public utility, to an alternative power source in case of a power failure with the public utility.

Typically, solenoids are mounted to a frame with a strap or a plate, which after multiple connects and disconnects cause the strap to become crinkled and worn. In addition, known solenoids only operate at a specific voltage. Therefore, multiple solenoids rated at various voltages are required to cover a voltage range.

It would be desirable to have a solenoid electrically connected to an accessory package, e.g., a module, with an attachment to mount the solenoid to a frame. Further, it would be desirable if the module provided transient voltage protection. Also, it would be desirable if the module enabled the solenoid to operate at various voltages. Lastly, it would be desirable if the module interfaced to the Internet to communicate solenoid status or accept activation commands.

BRIEF SUMMARY OF THE INVENTION

In an exemplary embodiment, a solenoid assembly includes an integrated module, including a rectifier, electrically and physically connected to a solenoid. The solenoid assembly remotely actuates an Automatic Transfer Switch (ATS). The module includes a full-wave bridge rectifier, voltage transient protection components, a resistor module, a Hall effect device, and a communication interface. In addition, the module is mechanically coupled to an attachment to fasten the solenoid assembly to a frame. Further, the module interfaces with a microprocessor. The wiring electrically connecting the rectifier to the solenoid is placed within a housing enclosing the module. This housing serves to protect the electrical components from human touch.

In an exemplary embodiment of the invention, the module includes a full-wave bridge rectifier electrically connected to alternating voltage. The full-wave bridge rectifier is electrically connected to the voltage transient protection components, and the resistor module. The resistor module accepts various values of resistors and is electrically connected in series to the solenoid. The solenoid includes a plunger. The plunger is connected to the Automatic Transfer Switch. The Hall effect device is in proximity to the solenoid's plunger extension. The Hall effect device senses and conveys the position of the solenoid's plunger. The communication interface is connected to the Internet from which the module receives remote commands and transmits status of the solenoid.

In an exemplary embodiment, the full-wave bridge rectifier includes a plurality of diodes. Alternating voltage is input to the full-wave bridge rectifier which converts alternating voltage to direct voltage. Transient voltage protection for the full-wave bridge rectifier and other devices, e.g., Hall effect device and communications interface, is provided.

The full-wave bridge rectifier and transient voltage protection circuitry are electrically connected to a resistor module. The resistor module is electrically connected in series with the solenoid and affects the voltage delivered to the solenoid windings. By varying the resistance value of resistors, the resistor module enables the solenoid to electrically connect to various voltages, e.g., 120V, 208V, 240V, 277V, and 480V. This allows, the voltage across the solenoid coil to be of a set voltage, e.g., 120V, and the selected resistor to accommodate a line voltage.

The Hall effect device senses the plunger's position. The microprocessor, interfacing with the module, executes a program to store the plunger position and the solenoid activation state. The plunger's position is stored in memory when a microprocessor executes the program. In addition, the plunger's position is transferred across the Internet when the communications interface receives a command from the Internet.

The above described solenoid assembly is a cost-effective and reliable and provides transient voltage protection, enables a solenoid to operate at various voltages, accept remote commands and report a status over the Internet, and allows the solenoid to be attached to a frame.

DETAILED DESCRIPTION OF THE INVENTION

Figure 1:
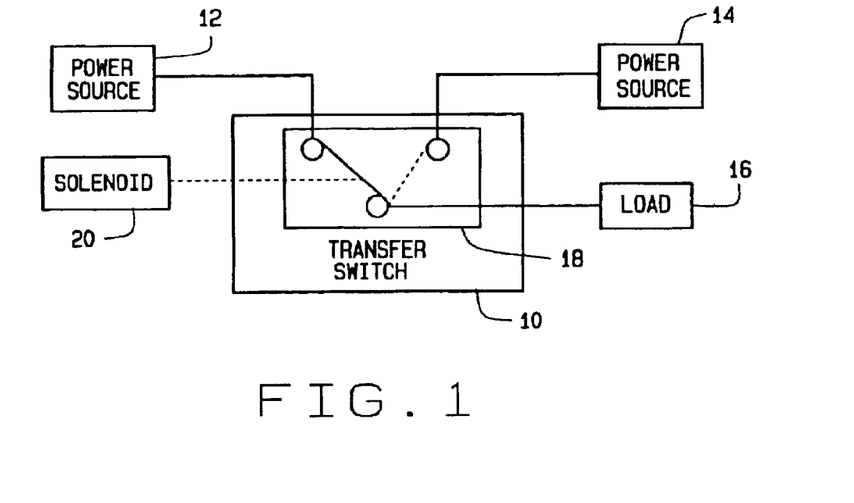
FIG. 1 is a diagram of a known Automatic Transfer Switch.

FIG. 1 illustrates a known Automatic Transfer Switch (ATS) 10 for switching electric power among a plurality of power sources. ATS 10 is electrically connected to a power source 12, a power source 14 and a load 16. Power source 12 typically is a public electric utility that supplies electrical power to load 16, such as a hospital, an airport radar tower, or other continuous electrical power user. If, for example, power source 12 fails or becomes inadequate to supply the electrical power required by load 16, ATS 10 transfers the source of electrical power from power source 12 to power source 14. In one embodiment, power source 14 is a generator set. ATS 10 monitors the condition of power source 12. When the voltage generated by power source 12 is restored to a predetermined level, ATS 10 transfers load 16 from power source 14 back to power source 12. The foregoing description of ATS 10 operation is exemplary only, and additional functions may be performed by automatic transfer switches such as ATS 10.

ATS 10 includes a mechanical drive assembly (not shown). The mechanical drive assembly is connected to a moveable contact assembly 18, which is connected either to power source 12 or power source 14. A solenoid 20 is mechanically connected to the mechanical drive assembly. By energizing solenoid 20, ATS 10 is able to transfer power from power source 12 to power source 14. In an alternative embodiment, solenoid 20 is mechanically connected to actuate a multi-pole contactor (not shown).

Figure 2:
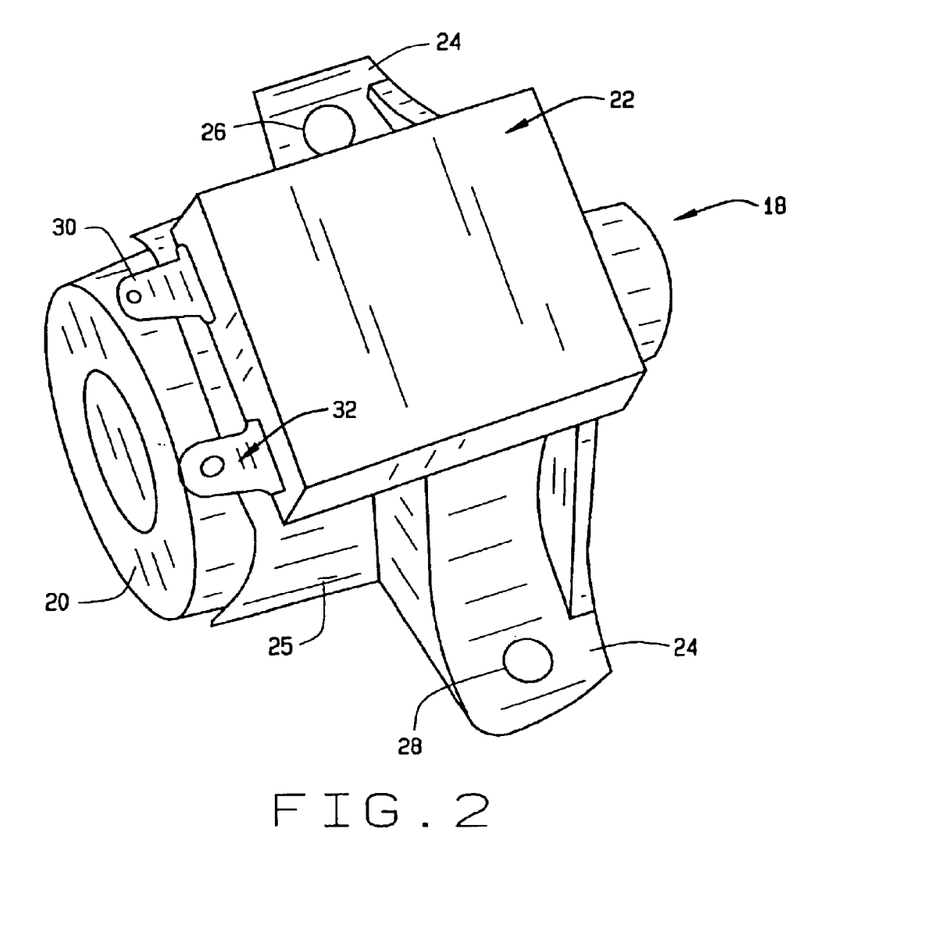
FIG. 2 is an illustration of a solenoid with an integrated mounted rectifier and mounting strap.

FIG. 2 illustrates a solenoid assembly 18 including a solenoid 20 electrically and mechanically connected to a module 22, an attachment 24, and a mounting surface 25. Attachment 24 includes openings 26 and 28 to mount solenoid 20 to a frame of ATS 10 (not shown). Attachment 24 includes a concave mounting device 25 that couples to solenoid 20. In one embodiment, attachment 24 is integrally molded with mounting device 25 and module 22. In an alternative embodiment, mounting device 25 is integrally coupled to module 22. In a further alternative embodiment, attachment 24 is a flange including an opening coupled to module 22 and mounting device 25. In a further alternative embodiment, solenoid 20, module 22, mounting device 25, and attachment 24 are configured as a single unit. Attachment 24 coupled with mounting device 25 is configured to mount solenoid 20 and module 22 to a frame of ATS 10 (not shown). In an alternative embodiment, attachment 24 and mounting device 25 are configured to mount solenoid 20 to a frame of ATS 10 (not shown).

Module 22 is a housing for an electrical circuit (not shown in FIG. 2) described below. Module 22, attachment 24 and mounting device 25 are water resistant and fabricated from plastic. In an alternative embodiment, module 22, attachment 24 and mounting device 25 are fabricated from metal, which serves to electrically ground a rectifier circuit (shown in FIG. 3 and FIG. 4). In a further embodiment, module 22 is fabricated from plastic, and attachment 24, mounting device 25 are fabricated from metal. In a still further embodiment, module 22 is fabricated from metal, and attachment 24 and mounting device 25 are fabricated from a plastic. Furthermore, module 22 includes terminals 30 and 32 which are electrically connected to alternating voltage to power the rectifier circuit (not shown in FIG. 2).

Figure 3:
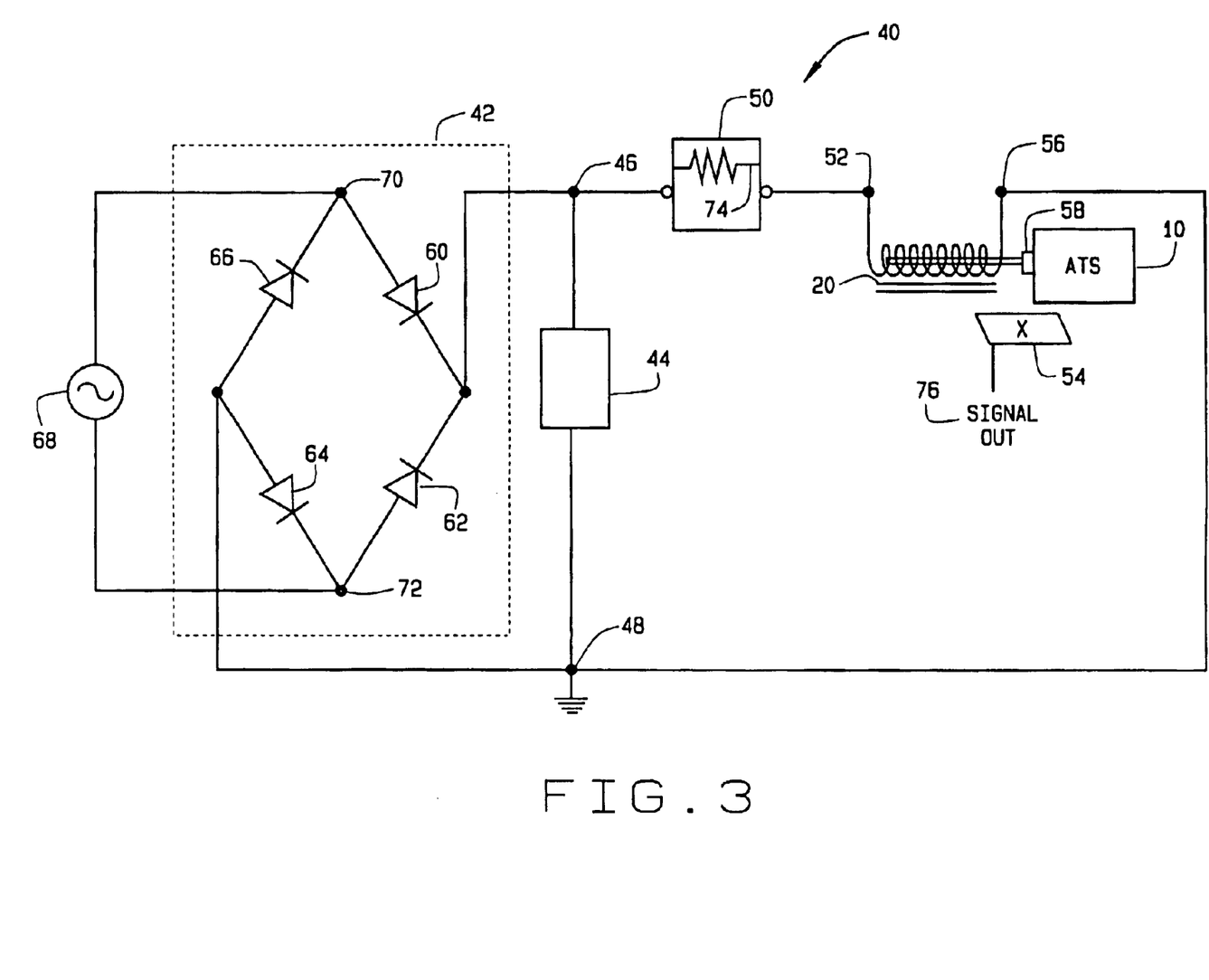
FIG. 3 is a schematic of an exemplary embodiment of a rectifier circuit.

FIG. 3 is a schematic of an exemplary embodiment of an electric circuit 40 housed in module 22 (shown in FIG. 2). Electric circuit 40 comprises a full-wave bridge rectifier 42 electrically connected to transient voltage protection circuitry 44 at nodes 46 and 48. Transient voltage protection circuitry 44 is electrically connected to resistor module 50 at node 46. Resistor module 50 is connected in series with solenoid 20 (shown in FIG. 2) at node 52. Hall effect device 54 is located in the proximity of 20. Solenoid 20 is connected to ATS 10 (shown in FIG. 1) via plunger 58. In one embodiment full-wave bridge rectifier 42 includes diodes 60, 62, 64 and 66. Full-wave bridge rectifier 42 is connected to a voltage source 68 at nodes 70 and 72.

In one embodiment, transient voltage protection circuitry 44 is connected to nodes 46 and 48, after full-wave bridge rectifier 42, to protect the windings and electronics of solenoid 20. In an alternative embodiment, transient voltage protection circuitry 44 is connected to nodes 70 and 72, before full-wave bridge rectifier 42, to protect diodes 60, 62, 64, and 66. In one embodiment, transient voltage protection circuitry 44 includes a common mode choke circuit. In another embodiment, transient voltage protection circuitry 44 includes a free-wheeling diode. In a further alternative embodiment, transient voltage protection circuitry 44 includes metal oxide varistors (MOVs).

Resistor module 50 includes a plug-in resistor 74. Plug-in resistor 74 reduces the voltage to solenoid 20. By selecting various resistor values for plug-in resistor 74, solenoid 20 can be electrically connected to various operating voltages, e.g., 120V, 208V, 240V, 277V, and 480V. In addition, resistor module 50 protects the windings of solenoid 20 by "opening" the electric circuit in the event solenoid 20 is energized and its plunger 58 is unable to move. In one embodiment, resistor module 50 is connected in series after the full-wave bridge rectifier 42 at nodes 46 and 52. In another embodiment, resistor module 50 is electrically connected in series before full-wave bridge rectifier 42 between voltage source 68 and node 70. In yet another embodiment, resistor 74 is hard-wired in electric circuit 40.

Hall effect device 54 is located in proximity to solenoid 20 to detect an extension of solenoid plunger 58. In one embodiment, Hall effect device 54 is connected to an external controller (not shown) via signal out 76 to indicate plunger's 58 position. In an alternative embodiment, Hall effect device 54 is connected to a microprocessor (shown in FIG. 5). In a further alternative embodiment, a limit switch is electrically connected to solenoid 20 to determine plunger's 58 position.

In one embodiment, solenoid assembly 18 (shown in FIG. 2) is connected to ATS 10 (shown in FIG. 1). The plunger 58 of solenoid 20 (shown in FIG. 2) is mechanically coupled to a mechanical drive assembly (not shown) of ATS 10. The mechanical drive assembly is connected to a moveable contact assembly (not shown), which is connected to a power source 12 (shown in FIG. 1), e.g., electric utility power source, or power source 14 (shown in FIG. 1), e.g., a generator set. By energizing solenoid 20, ATS 10 transfers power from power source 12 to power source 14. In an alternative embodiment, solenoid 20 is mechanically connected to actuate a multi-pole contactor (not shown). In a further alternative embodiment, solenoid assembly 18 is used in alternating current applications.

Figure 4:
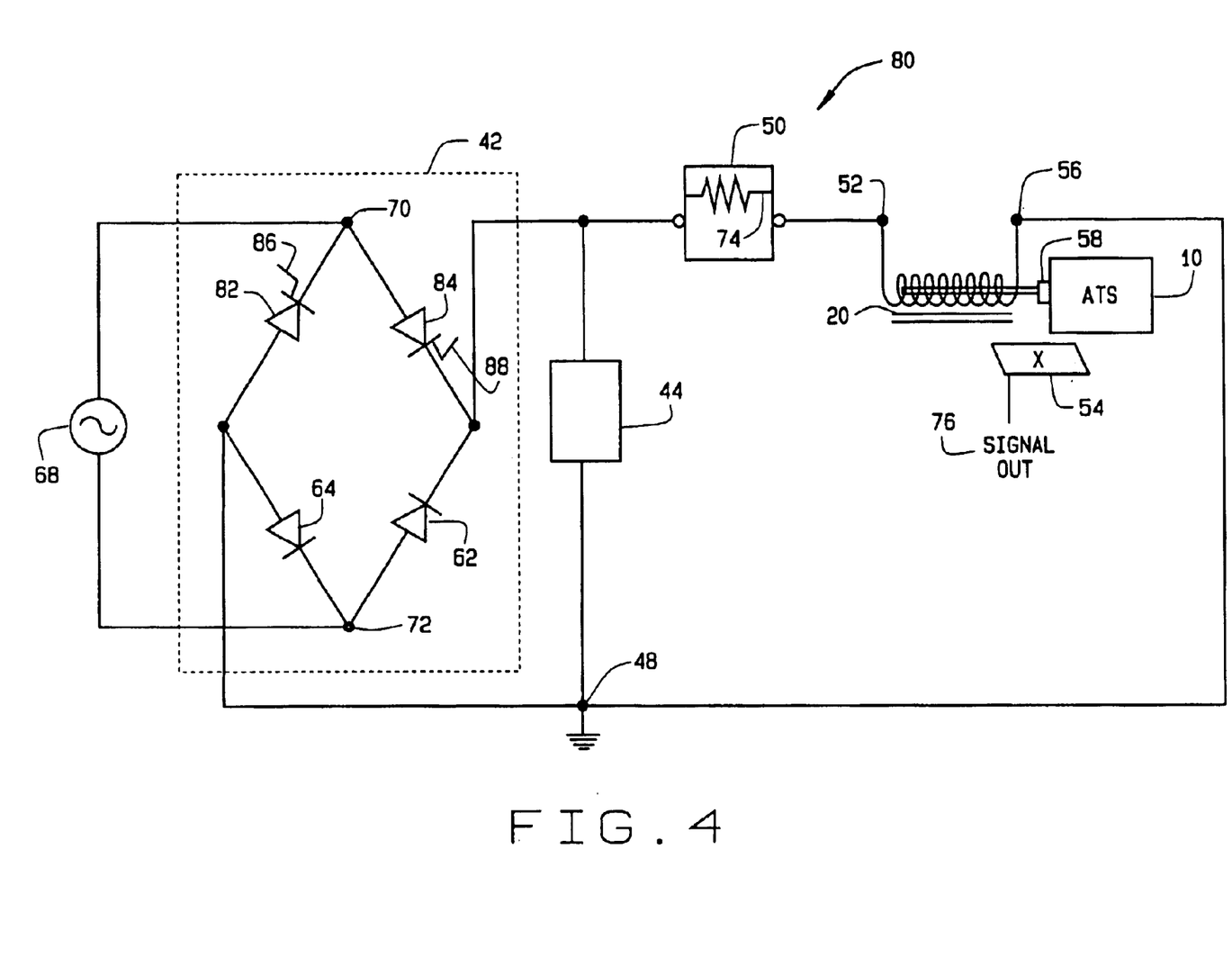
FIG. 4 is a schematic of an exemplary embodiment of a rectifier circuit using silicon controller rectifiers.

FIG. 4 is a schematic of an exemplary embodiment of an electric circuit 80 housed in module 22. Components of electric circuit 80, identical to the components of electric circuit 40 (shown in FIG. 3), are identified in FIG. 4 using the same reference numerals as used in FIG. 3. Electric circuit 80 comprises a full-wave bridge rectifier 42 electrically connected to transient voltage protection circuitry 44 at nodes 46 and 48. Transient voltage protection circuitry 44 is electrically connected to resistor module 50 at node 46. Resistor module 50 is connected in series with solenoid 20 (shown in FIG. 2) at node 52. Hall effect device 54 is located in proximity to solenoid 20. Solenoid 20 is connected to ATS 10 (shown in FIG. 1) via plunger 58. Full wave bridge-rectifier 42 includes silicon controlled rectifiers (SCRs) 82 and 84 and diodes 62 and 64. In one embodiment, SCRs' 82 and 84 gates 86 and 88 are electrically connected to an external controller (not shown) to control turning full-wave bridge rectifier 42 "on" and "off". Full-wave bridge rectifier 42 is connected to a voltage source 68 at nodes 70 and 72.

Figure 5:
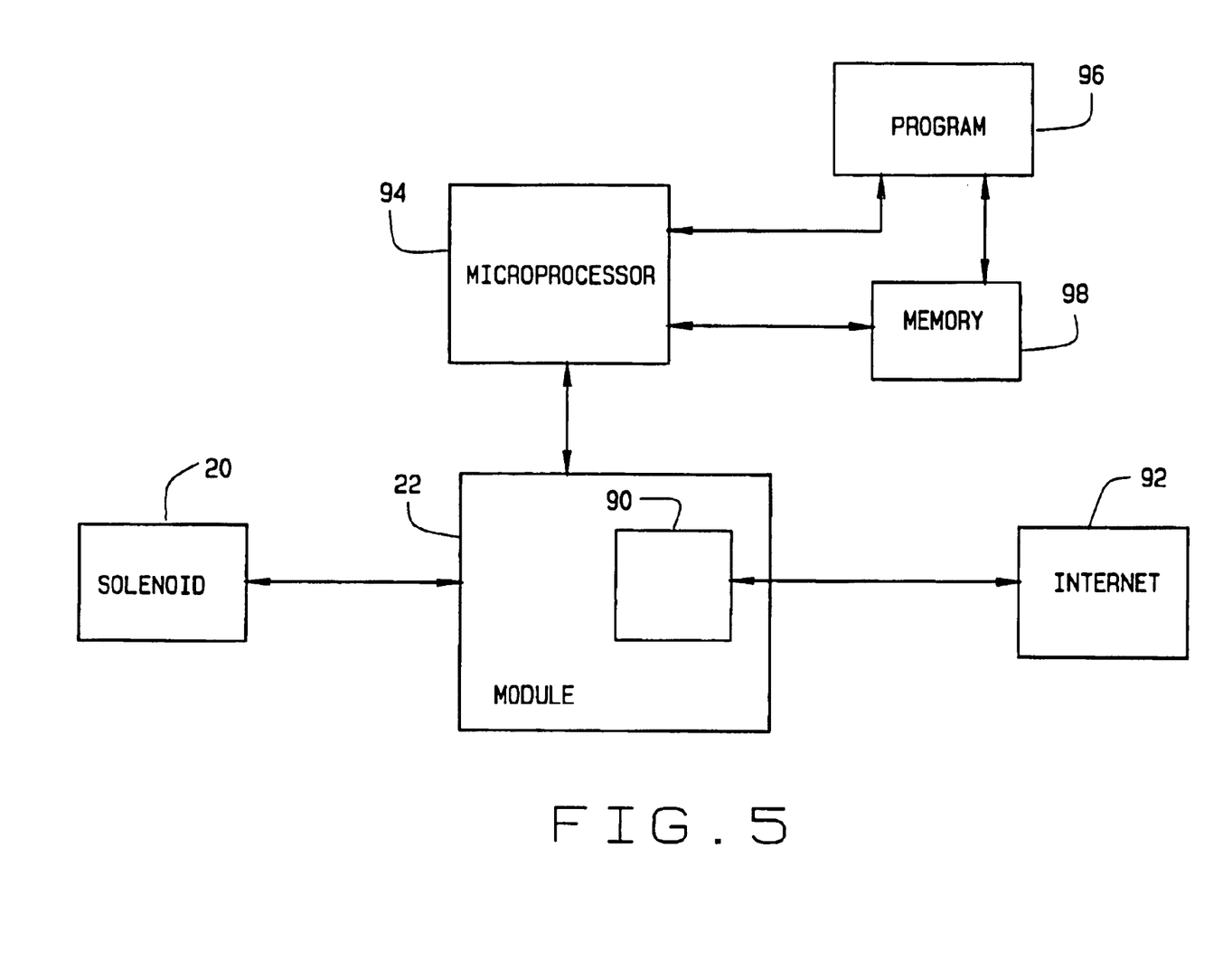
FIG. 5 is a block diagram of a module connected to the Internet.

FIG. 5 is a block diagram of module 22 (shown in FIG. 2) connected to solenoid 20 (shown in FIG. 2). Module 22 includes a communication device 90 electrically connected to the Internet 92. Module 22 is also electrically connected to microprocessor 94. Microprocessor 94 interfaces with program 96 and is electrically connected to Hall effect device 54 (shown in FIG. 3 and FIG. 4), memory 98 and communications device 90.

The term microprocessor, as used herein, refers to microcontrollers, CPUs, reduced instruction set circuits (RISC), application specific integrated controllers (ASICs), logic circuits, and any other circuit or processor capable of interfacing with memory and executing a series of instructions or software programs. In one embodiment, memory 98 is volatile Random Access Memory (RAM). In an alternative embodiment, memory 98 is nonvolatile memory (NVRAM). In a further alternative embodiment, memory 98 is Programmable Read-Only memory (PROM). In a still further alternative embodiment, memory 98 is Electrically Eraseable Programmable Read-Only Memory (EEPROM).

In an exemplary embodiment, communications device 90 is a modem connected to the Internet 92. In an alternative embodiment, communications device 90 is connected to a dedicated phone-link (not shown). In a further alternative embodiment, communications device 90 is connected to a dedicated T1 line. In a still further alternative embodiment, communications device 90 is connected to a Digital Subscriber Line (DSL). In another embodiment, communications device 90 is connected to an Integrated Services Digital Network (ISDN). In yet another embodiment, communications device 90 is connected to a communications cable. In yet another embodiment, wireless technologies are used to facilitate connection to communications device 90. In an additional embodiment, communications device 90 is connected to an intranet. In yet an additional embodiment, communications device 90 is connected to satellite technologies.

In the exemplary embodiment, module 22 responds to commands sent from a remote location to actuate electrical switching functions. Communications device 90 receives commands from the Internet 92. In one embodiment, the commands request plunger's 58 (shown in FIG. 3 and FIG. 4) position. In another embodiment, the commands request to actuate solenoid 20. In yet another embodiment, the commands request solenoid's 20 status. Communication device 90 transmits the information requested over the Internet 92.

In one embodiment, microprocessor 94, memory 98, and program 96 are included in an external controller (not shown) electrically connected to module 22. In one embodiment, program 96 is executed by microprocessor 94. Program 96 commands microprocessor 94 to have module 22 determine a plunger 58 (shown in FIG. 3 and FIG. 4) position of solenoid 20 and store the information in memory 98. Program 96 also commands microprocessor 94 determine if solenoid 20 has been actuated and store the information in memory 98. In an alternative embodiment, microprocessor 94, memory 98, program 96, are contained within the housing of module 22.

The methods and apparatus as described here in are not limited to actuating Automatic Transfer Switches by using a solenoid. Another example of a system that can be actuated by using a solenoid is a lighting contactor. A further example of a system that can be actuated using a solenoid is an emergency bus to conserve power.

While the invention has been described in terms of various specific embodiments, those skilled in the art will recognize that the invention can be practiced with modification within the spirit and scope of the claims.

What is claimed is:

1. A method of fabricating a solenoid assembly for operating at multiple supply voltages and for suppressing voltage transients in a power supply voltage, said method comprising the steps of:
   physically configuring a module for use as a mounting device for the solenoid;
   mounting the solenoid to a frame using the mounting device;
   electrically configuring the module for a desired solenoid performance; and
   configuring the module to respond to commands sent from a remote location.

2. A method in accordance with claim 1 wherein a full-wave bridge rectifier including a plurality of diodes, said step of electrically configuring the module further comprises the step of converting an alternating voltage to a direct voltage using a full-wave bridge rectifier.

3. A method in accordance with claim 1 wherein a full-wave bridge rectifier including at least a plurality of silicon controlled rectifiers and a plurality of diodes, said step of electrically configuring the module comprises the step of converting an alternating voltage to a direct voltage using a full-wave bridge rectifier.

4. A method in accordance with claim 1 wherein a full-wave bridge rectifier including a plurality of silicon controlled rectifiers and diodes, and a controller is electrically connected to the plurality of silicon controlled rectifiers, said step of electrically configuring the module comprises the step of turning "on" and "off" the full-wave bridge rectifier by controlling the plurality of silicon controlled rectifiers.

5. A method in accordance with claim 1 wherein said step of electrically configuring the module comprises the step of filtering an alternating voltage using at least one of a free-wheeling diode, a common mode choke, and a metal oxide varister.

6. A method in accordance with claim 1 wherein a resistor is electrically connected in series to the solenoid, said step of electrically configuring the module comprises the step of selecting a resistor value for the series resistor.

7. A method in accordance with claim 1 wherein a resistor is electrically connected in series to the solenoid, said step of electrically configuring the module comprises the step of maintaining a constant voltage across the solenoid by increasing the voltage across the series resistor.

8. A method in accordance with claim 1 wherein a limit switch is electrically connected to the solenoid, said step of electrically configuring the module comprises the step of determining the solenoid's plunger position using a limit switch.

9. A method in accordance with claim 1 wherein a Hall effect device is located in proximity to the solenoid, said step of electrically configuring the module comprises the step of determining the solenoid's plunger position using a Hall effect device.

10. A method in accordance with claim 1 wherein said step of physically configuring a module comprises the step of configuring the module with attachments including openings.

11. A method in accordance with claim 1 wherein said step of physically configuring a module comprises the step of fabricating the module from at least one of a plastic and a metal.

12. A method in accordance with claim 1 wherein said step of physically configuring a module comprises the step of configuring the module with a plurality of electrical terminals.

13. A method in accordance with claim 1 wherein said step of configuring the module to respond to commands sent from a remote location comprises the step of electrically connecting the module to the Internet.

14. A method in accordance with claim 13 wherein said step of configuring the module to respond to commands sent from a remote location comprises the step of configuring a microprocessor to execute a program.

15. A method in accordance with claim 13 wherein a communications device is electrically connected to the module said step of configuring the module to respond to commands sent from a remote location comprises the step of accepting commands from at least one of an internet, an intranet, a T1 line, a dedicated phone link, a DSL line, an ISDN line, a communications cable, satellite technology, and wireless technology.

16. A method in accordance with claim 1 wherein said step of configuring the module to respond to commands sent from a remote location comprises the step of configuring the module to store the solenoid's plunger position in memory.

17. A method in accordance with claim 1 wherein said step of configuring the module to respond to commands sent from a remote location comprises the step of configuring the module to store an activation state of the solenoid in a memory.

18. A method in accordance with claim 1 wherein said step of configuring the module to respond to commands sent from a remote location comprises the step of transmitting requested information stored in memory to a communications device for transmission using at least one of an internet, an intranet, a T1 line, a dedicated phone link, a DSL line, an ISDN line, a communications cable, satellite technology, and wireless technology.

19. An apparatus comprising:
a module comprising a mounting surface;
a plurality of terminals; and
a plurality of attachments, said mounting surface having a circumferential shape to mechanically connect to a solenoid, said plurality of terminals extending along a longitudinal axis of said solenoid, said plurality of attachments extending radially from said solenoid.

20. An apparatus in accordance with claim 19 wherein the solenoid includes windings, said module electrically connected to said solenoid windings.

21. An apparatus in accordance with claim 19 wherein said module further comprises an electric circuit housed within said module.

22. An apparatus in accordance with claim 21 wherein said electric circuit comprises a full-wave diode bridge connected to an alternating voltage source.

23. An apparatus in accordance with claim 22 wherein said full-wave diode bridge comprises a plurality of diodes.

24. An apparatus in accordance with claim 22 wherein said full-wave diode bridge comprises at least one of a plurality of silicon controlled rectifiers and a plurality of diodes.

25. An apparatus in accordance with claim 24 wherein said silicon controlled rectifiers' (SCRs) gates connected to an external controller, said SCRs configured to turn said full-wave bridge "on" and "off".

26. An apparatus in accordance with claim 21 wherein said electric circuit further comprises a plug-in resistor, said resistor electrically connected in series to said solenoid.

27. An apparatus in accordance with claim 26 wherein said resistor configured to be a potentiometer.

28. An apparatus in accordance with claim 21 wherein said electric circuit further comprises a transient voltage protection circuit.

29. An apparatus in accordance with claim 27 wherein said transient protection circuit comprises at least one of a free-wheeling diode, a common mode choke and a metal oxide varister.

30. An apparatus in accordance with claim 21 wherein said electric circuit further comprises a Hall effect device located in proximity to said solenoid.

31. An apparatus in accordance with claim 21 wherein said electric circuit further comprises a limit switch electrically connected to said solenoid.

32. An apparatus in accordance with claim 30 wherein said electric circuit further comprises a microprocessor electrically connected to said Hall effect device.

33. An apparatus in accordance with claim 21 wherein said electric circuit further comprises a communications device.

34. An apparatus in accordance with claim 21 wherein said electric circuit further comprises a microprocessor interfacing with a memory.

35. An apparatus in accordance with claim 34 wherein said memory configured to be at least one of a volatile Random Access Memory (RAM), a nonvolatile Random Access Memory, a Programmable Read Only Memory (PROM), and Electrically Eraseable Read Only Memory (EEPROM).

36. An apparatus in accordance with claim 34 wherein said microprocessor configured to be at least one of a microcontrollers, a reduced instruction set circuits (RISC), and an application specific integrated controllers (ASICs).

37. An apparatus in accordance with claim 21 wherein said electric circuit further comprises a microprocessor executing a program.

38. An apparatus in accordance with claim 21 wherein said electric circuit further comprises said microprocessor executing a program to store a plunger position of said solenoid in memory.

39. An apparatus in accordance with claim 21 wherein said electric circuit further comprises a microprocessor executing a program to store an activation state of said solenoid in a memory.

40. An apparatus in accordance with claim 21 wherein said electric circuit configured to interface to at least one of an internet, an intranet, a T1 line, a dedicated phone link, a DSL line, an ISDN line, a communications cable, satellite technology, and wireless technology.

41. An apparatus in accordance with claim 21 wherein said electric circuit comprises a communications device interfacing to at least one of an internet, an intranet, a T1 line, a dedicated phone link, a DSL line, an ISDN line, a communications cable, satellite technology, and wireless technology.

42. An apparatus in accordance with claim 21 wherein said electric circuit configured to accept a command transferred from at least one of an internet, an intranet, a T1 line, a dedicated phone link, a DSL line, an ISDN line, a communications cable, satellite technology, and wireless technology.

43. An apparatus in accordance with claim 21 wherein said electric circuit configured to respond to a command from a remote location using at least one of an internet, an intranet, a T1 line, a dedicated phone link, a DSL line, an ISDN line, a communications cable, satellite technology, and wireless technology.

44. An apparatus in accordance with claim 21 wherein said electric circuit configured to transmit said solenoid's plunger position to a remote location using at least one of an internet, an intranet, a T1 line, a dedicated phone link, a DSL line, an ISDN line, a communications cable, satellite technology, and wireless technology.

45. An apparatus in accordance with claim 21 wherein said electric circuit configured to transmit an activation state of said solenoid to a remote location using at least one of an internet, an intranet, a T1 line, a dedicated phone link, a DSL line, an ISDN line, a communications cable, satellite technology, and wireless technology.

46. A solenoid assembly configured to actuate an automatic transfer switch, said solenoid assembly comprising:
  a solenoid; and
  a module electrically connected to said solenoid, wherein said module includes at least one plug-in resistor whose values are selected to electrically connect said solenoid to multiple voltages.

47. A solenoid assembly in accordance with claim 46 wherein said solenoid includes windings.

48. A solenoid assembly in accordance with claim 46 wherein said module comprises a full-wave bridge rectifier, a transient voltage protection circuitry, a Hall effect device, and a communications device.

49. A solenoid assembly in accordance with claim 46 wherein said module further comprises a microprocessor, a memory, and a program.

50. A solenoid assembly in accordance with claim 49 wherein said memory comprises at least one of a volatile Random Access Memory (RAM), a nonvolatile Random Access Memory, a Programmable Read Only Memory (PROM), and Electrically Eraseable Read Only Memory (EEPROM).

51. A solenoid assembly in accordance with claim 49 wherein said microprocessor comprises at least one of a microcontrollers, a reduced instruction set circuits (RISC), and an application specific integrated controllers (ASICs).

52. A solenoid assembly in accordance with claim 49 wherein said microprocessor configured to execute a program.

53. A solenoid assembly in accordance with claim 49 wherein said microprocessor electrically connected to a Hall effect device.

54. A solenoid assembly in accordance with claim 49 wherein said microprocessor configured to execute a program to store a plunger position of said solenoid in memory.

55. A solenoid assembly in accordance with claim 49 wherein said microprocessor configured to execute a program to store an activation state of said solenoid in said memory.

56. A solenoid assembly in accordance with claim 48 wherein said full-wave bridge rectifier electrically connected to an alternating voltage.

57. A solenoid assembly in accordance with claim 48 wherein said full-wave bridge rectifier comprises a plurality of diodes.

58. A solenoid assembly in accordance with claim 48 wherein said full-wave bridge rectifier comprises at least a plurality of silicon controlled rectifiers and a plurality of diodes.

59. A solenoid assembly in accordance with claim 55 wherein gates of said silicon controller rectifiers electrically connected to an external controller, said silicon controller rectifiers configured to turn said full-wave bridge rectifier "on" and "off".

60. A solenoid assembly in accordance with claim 46 wherein said plug-in resistor electrically connected in series to said solenoid.

61. A solenoid assembly in accordance with claim 46 wherein said plug-in resistor configured to be a potentiometer.

62. A solenoid assembly in accordance with claim 48 wherein said transient voltage protection circuitry comprises at least one of a free-wheeling diode, a common mode choke and a metal oxide varister.

63. A solenoid assembly in accordance with claim 48 wherein said module further comprises a limit switch, said limit switch connected to said solenoid.

64. A solenoid assembly in accordance with claim 46 wherein said module interfaces with at least one of an internet, an intranet, a T1 line, a dedicated phone link, a DSL line, an ISDN line, a communications cable, satellite technology, and wireless technology.

65. A solenoid assembly in accordance with claim 46 wherein said module comprises a communications device interfacing to at least one of an internet, an intranet, a T1 line, a dedicated phone link, a DSL line, an ISDN line, a communications cable, satellite technology, and wireless technology.

66. A solenoid assembly in accordance with claim 46 wherein said module configured to accept a command transferred from at least one of an internet, an intranet, a T1 line, a dedicated phone link, a DSL line, an ISDN line, a communications cable, satellite technology, and wireless technology.

67. A solenoid assembly in accordance with claim 46 wherein said module configured to respond to a command from a remote location using at least one of an internet, an intranet, a T1 line, a dedicated phone link, a DSL line, an ISDN line, a communications cable, satellite technology, and wireless technology.

68. A solenoid assembly in accordance with claim 46 wherein said module configured to transmit said solenoid's plunger position to a remote location using at least one of an internet, an intranet, a T1 line, a dedicated phone link, a DSL line, an ISDN line, a communications cable, satellite technology, and wireless technology.

69. A solenoid assembly in accordance with claim 46 wherein said module configured to transmit an activation state of said solenoid to a remote location using at least one of an internet, an intranet, a T1 line, a dedicated phone link, a DSL line, an ISDN line, a communications cable, satellite technology, and wireless technology.

* * * * *

UNITED STATES PATENT AND TRADEMARK OFFICE
CERTIFICATE OF CORRECTION

PATENT NO. : 6,853,530 B1 Page 1 of 1
APPLICATION NO. : 09/662932
DATED : February 8, 2005
INVENTOR(S) : Radusewicz et al.

It is certified that error appears in the above-identified patent and that said Letters Patent is hereby corrected as shown below:

In Claim 59, column 10, line 6, between "rectifiers" and "electrically" insert -- are --.

Signed and Sealed this

Sixth Day of November, 2007

JON W. DUDAS
*Director of the United States Patent and Trademark Office*